Aug. 8, 1967
P. R. MATRAVERS
3,334,752
DUAL MEDIA FILTER ELEMENT
Filed Jan. 23, 1964
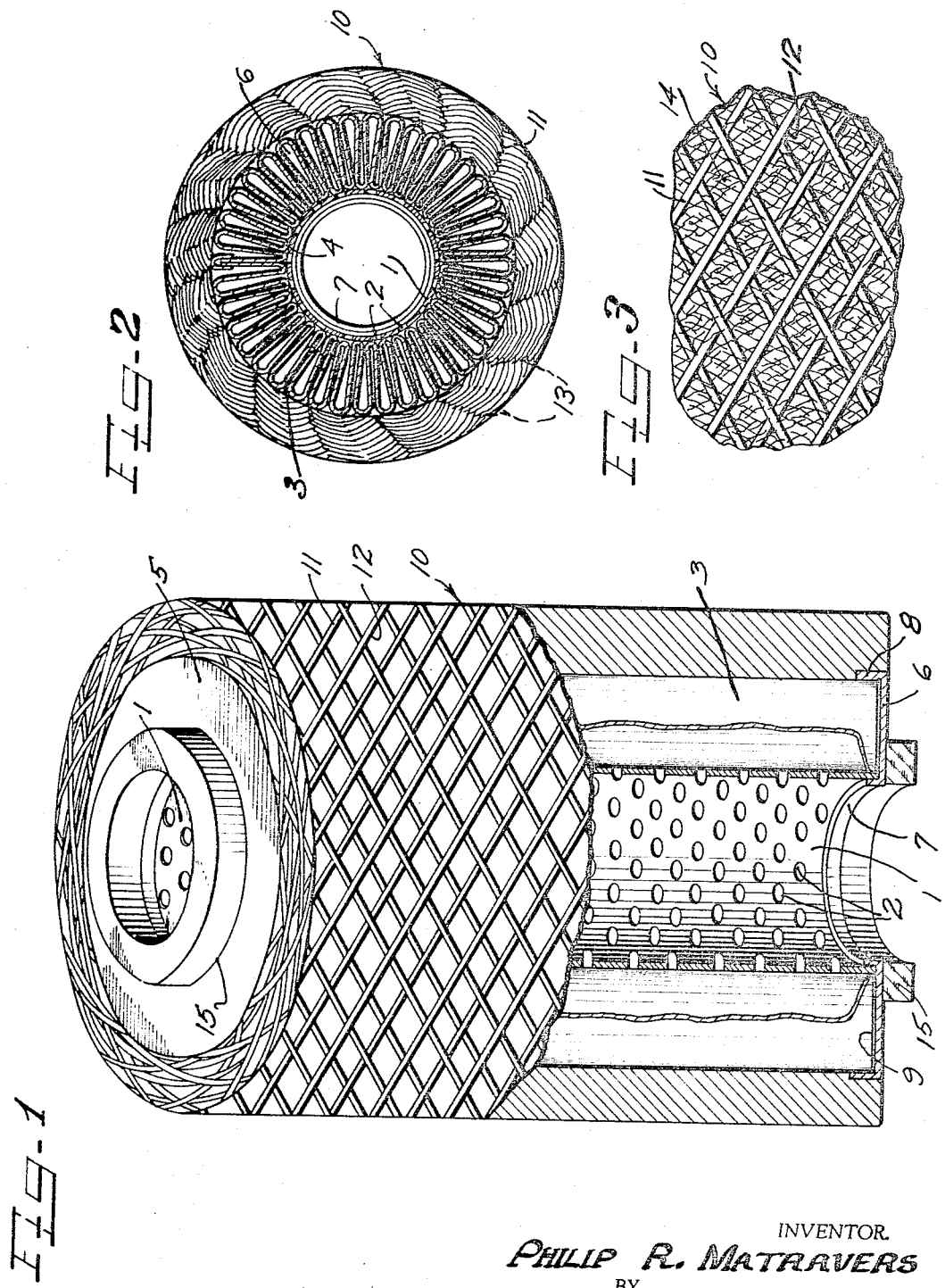
INVENTOR.
PHILIP R. MATRAVERS
BY
ATTORNEYS

United States Patent Office 3,334,752
Patented Aug. 8, 1967

3,334,752
DUAL MEDIA FILTER ELEMENT
Philip R. Matravers, Indianapolis, Ind., assignor to Commercial Filters Corporation, Lebanon, Ind., a corporation of New York
Filed Jan. 23, 1964, Ser. No. 339,802
4 Claims. (Cl. 210—457)

This invention relates to improvements in a dual media filter element, and more particularly to a filter element highly desirable for the filtering of engine fuel oils, although it may be utilized for the filtering of other liquid fuels, lubricants and various liquids, as will be apparent to one skilled in the art.

In the past, many and various types of filters have been utilized and many are still being utilized for the clarification of fuel oils and lubricants. One popular filter element is made of pleated paper impregnated with a thermosetting resin or the like to produce the adequate stiffness and such an element provides an extremely large surface area with a large dirt holding capacity particularly where solid contaminants are concerned. Another popular filter element is one known in the trade as a honeycomb filter, this being a fibrous yarn or roving wound so as to define a number of diamond-shaped honeycomb patterns which form inwardly narrowing passages from the outside of the tube to the inside thereof and the yarn is napped so there will be a myriad of fibers extending across each passage. A honeycomb filter would not have the extensive surface area of the pleated paper element and consequenlty less dirt holding capacity as to solid contaminants, but the honeycomb filter is highly satisfactory where contaminants of a slimy or gelatinous nature are contained in the liquid being filtered.

Diesel and other fuel oils, and many lubricants may have natural waxes, resinous materials, asphaltenes, additives or other substances present which, under certain conditions of operation may form a slime. Some slime forming contaminants may be naturally present in the liquid and some of them may be products of deterioration of the liquid during its use. If a small amount of water is present in the liquid being filtered the sliming condition is greatly aggravated and, in some cases, will not occur unless water is present. When sliming occurs, a pleated paper filter element is soon coated over its surface and blinded off so that more pressure is necessary to force the liquid being filtered through the element. While this fact is an important one to consider at any time, it is of particular importance when a pleated paper fuel filter element is mounted on the suction side of the fuel pump, as is frequently the case. On the suction side of the fuel pump, there is a very low pressure differential across the filter element or cartridge. Since that low pressure differential cannot be increased, when sliming occurs the pleated paper element is blinded off and must prematurely be replaced. On the other hand, a honeycomb filter element very effectively filters out slimy contaminants for a long period of time without blocking off. Due to its relatively small surface area, however, the honeycomb element has a correspondingly small dirt holding capacity in regard to solid contaminants. Accordingly, the ultimate user had to choose whichever element appeared best for the purpose, depending upon the contents of the liquid being filtered and the character of contaminants that might be found therein.

With the foregoing in mind, it is an important object of the instant invention to provide a filter element or cartridge possessing all of the advantages of both a pleated paper filter element and a honeycomb filter element, with the elimination of the disadvantages of each of them.

It is also an important object of the instant invention to provide a dual media filter element having an upstream medium highly efficient in the removal of slimy contaminants, and a downstream medium highly efficient in the removal of abrasives and other foreign contaminants, the resultant structure being longer lived and more efficient than filters for the same purpose used heretofore.

Another object of this invention is the provision of a dual media fuel filter, having a downstream medium of pleated paper impregnated with a thermosetting resin for the removal of abrasive and foreign solid particles, and an upstream medium of fibrous fuzzy yarn having passages therethrough with fibers from the yarn projecting over said passages, for the removal of slimy contaminants such as waxes, resins, asphaltic materials, and the like.

It is also an object of this invention to provide a fuel filter having a central perforate core around which is disposed a medium comprising pleated paper for the removal of abrasive and foreign particles, and a second medium comprising a napped fuzzy yarn wound directly around the pleated paper medium in spaced crisscrossed convolutions to a satisfactory thickness for mainly removal of slimy contaminants.

While some of the more salient features, characteristics and advantages of the instant invention have been above pointed out, others will become apparent from the following disclosures, taken in conjunction with the accompanying drawing, in which:

FIGURE 1 is a perspective view of a filter element or unit embodying principles of the instant invention; showing the same partially in elevation and partially in vertical section;

FIGURE 2 is an end view of the structure of FIGURE 1, showing the outer medium in end elevation and the inner medium in transverse section below the end cap; and FIGURE 3 is a magnified fragmentary elevational view of a portion of the outer medium to better illustrate its construction.

As shown on the drawings:

In the illustrated embodiment of this invention there is shown a dual media filter element or unit embodying a perforate center tube 1 which may be of any suitable material and construction, but which can satisfactorily be a rigid tube 1 provided with numerous perforations 2 therein.

Around this center tube 1 is a filter medium 3 of pleated paper stiffened by any suitable substance such as a thermosetting resin or the equivalent. As is known, such a paper filter is of such desirable density as to remove even minute particles of solids from liquid passing therethrough. The pleats run longitudinally of the paper and the inner folds of the pleats preferably contact the center tube as indicated at 4 in FIGURE 2. The ends of the pleated paper medium 3 are sealed off by end caps 5 and 6 of identical construction. That structure is best seen with the end cap 6, which may satisfactorily be formed of metal, stiffened fiberboard, a suitable plastic, or some other satisfactory material. Each end cap may be provided with an inwardly extending inner annular flange 7, which may be desired although unnecessary with paperboard and the like, which flange extends inside the center tube 1. A longer inwardly extending outer annular flange is preferred and this flange extends along the outer face of the pleated paper medium 3. The end caps may be attached in any suitable manner, such as by a plastisol adhesive as indicated at 9.

Around the structure so far described, and more specifically around the outer folds in the pleats of the paper medium 3 and the flanges 8 from the end caps, the outer filter medium generally indicated by numeral 10 is wound.

The method of making the filter medium 10 as well as the resultant medium itself is more fully set forth and described in Maurice A. Goldman U.S. Letters Patent No. 1,958,268, issued May 8, 1934. For the medium 10, a loosely spun fuzzy yarn 11 of cotton fibers, viscose rayon, cellulose acetate, or other synthetic fibers is wound about the outer folds of the pleated paper element 3. This yarn may be satisfactorily 1/8 inch in diameter, and resembles a rove. The yarn is wound in convolutions spaced along the medium 3 in one direction and then rearwardly in the opposite direction in crisscrossed manner. This provides rhombic openings 12 between adjacent layers of the yarn as clearly seen in FIGURES 1 and 3. During the winding the strands of subsequent layers should be placed uniformly over the strands of previous layers, but the crossing points of the strands are preferably moved slightly as to circumferential position on the tubular medium as the tubular medium builds up. This causes the spaces 12 in the successive layers to form curvate tunnels, as indicated by dotted lines 13 in FIGURE 2, only two such tunnels being shown although there may be over 300 in a single medium. The tunnels run from the outside of the unit to the inside thereof. While the yarn is being wound, it is also napped to provide fibers extending therefrom across all the rhombic openings and accordingly many times across each of the tunnels 13. These fibers are indicated at 14 in FIGURE 3 and occlude the openings in a manner to establish adequate filtering.

The size and shape of the tunnels, number of layers of yarn, thickness of yarn, and amount and stiffness of fuzz or fibers may be varied within wide limits according to the capacity desired, the material to be filtered, and the pressure used. For purposes of fuel oil and similar substances, 1/8 inch spaces 12 covered by napped fibers which are held down by subsequent windings, should be satisfactory.

In the construction of the filter element of the instant invention, it is preferable to have the upstream medium or outer medium 10 exceed 1/2 the thickness of the downstream or inner medium 3. In the illustrated instance, the outer medium is 2/3 the thickness or width of the pleats in the inner medium. The comparative thicknesses are not essential, but the example given has proven quite effective under test.

As indicated in FIGURE 1 it will be noted that the outer medium 10, which is referred to in the trade as a honeycomb filter medium by virtue of the way it is wound, intimately overlies the outer folds of the pleats of the medium 3 as well as the flanges 8 on the end cap. At any time during the course of manufacture of the filter element, a sealing ring 15 may be adhesively or otherwise secured to each end cap to effect a seal between the element and the filter casing in which it is used. In certain types of casings such a seal may not be necessary at either or both ends of the element and in that event whatever structure may be needed to fit a particular casing may be substituted.

The structure illustrated and described herein is a filter element in which the fuel or lubricant to be filtered flows radially inwardly through the outer medium 10, secondly through the inner medium 3, and the filtrate exits through one end of the center tube 1. In a few instances in practice a reverse flow of the liquid is utilized, and in that event the fibrous medium 10 would be disposed around the center tube 1 and the pleated paper medium would surround the fibrous medium.

In use, the instant invention is extremely efficient and long lived before contamination rises to the point necessitating a substitute element. The fuel oil, lubricant, or material passing through the outer honeycomb medium 10 is freed of waxes, resins, asphaltic materials, and other slime forming substances so that such contaminants cannot block off the pleated paper filter. Abrasives such as solid dust, sand particles, and the like pass through the less dense medium 10, due to its known porosity, but are effectively stopped by the much denser pleated paper medium 3 and the liquid is clarified to an extremely high degree before it leaves the element. The slimy contaminants do not occlude the outer medium 10 for a considerable long period of usage, and it requires at least an equally long period of usage before the abrasive contaminants can block the pleated paper medium 3 sufficiently to warrant replacement of the element or unit. It will also be noted that the manufacture of the instant invention is not too costly considering the results obtained, and also considering the fact that without the dual media, a single media would have to be made substantially as large as both media combined. Consequently, the instant invention may be said to be highly economical because of its long life and the high degree of clarification resulting from its use.

It will be understood that modifications and variations may be effected without departing from the scope of the novel concepts of the present invention.

I claim as my invention:

1. A filter element having a pervious tubular center passage,
    a pair of radially contiguous filter media concentric with said passage and with each other,
    one of said media being located on the downstream side of the element and comprising a longitudinally pleated paper tube of a density to remove even minute particles of solids,
    the other of said media being located on the upstream side of the element and comprising a honeycomb winding of fuzzy yarn roving of diminishing porosity and less density than the paper tube but capable of effective removal of larger masses including sludge and slime forming substances,
    and means compelling all liquid to be filtered to pass through said less dense other media before reaching said denser paper tube.

2. A filter element as defined in claim 1, in which said other less dense medium is wound with relatively small tunnel-like openings therethrough and having yarn fibers extending in substantially fixed relation across the openings.

3. A filter element comprising:
    a pervious center tube,
    a pair of radially contiguous filter media around said tube,
    the inner of said media comprising a tube of longitudinally pleated paper of a density to remove even minute particles of solids,
    the outer of said media being of diminishing porosity and less dense than said paper tube but capable of effective removal of larger masses including sludge and slime-forming substances and comprising a honeycomb winding of a plurality of superposed crisscross layers of convolutions of a fuzzy yarn with the innermost layer intimately wound on the outer folds of the pleats of said paper tube in axially spaced relation,
    said windings providing filtering tunnels extending from the outer surface of the outer medium to the inner medium,
    said yarn having fibers which extend across the tunnels and form a plurality of filtering layers in each tunnel,
    and means sealing off the ends of said pleated paper tube to compel all liquid to be filtered to pass through said outer honeycomb filter medium before reaching said paper tube.

4. A filter medium as defined in claim 3, in which said sealing means comprise end caps having outer axially extending flanges engaging the contiguous outer folds of the paper tube pleats and upon which flanges the inner yarn layer of said honeycomb filter medium is wound.

References Cited

UNITED STATES PATENTS

| | | | |
|---|---|---|---|
| 1,958,268 | 5/1934 | Goldman | 210—494 |
| 2,368,216 | 1/1945 | Hastings et al. | 210—494 |
| 2,933,192 | 4/1960 | Gretzinger. | |

FOREIGN PATENTS

| | | |
|---|---|---|
| 826,114 | 12/1959 | Great Britain. |
| 892,663 | 3/1962 | Great Britain. |

REUBEN FRIEDMAN, *Primary Examiner.*

F. MEDLEY, *Assistant Examiner.*